March 3, 1931.  E. F. NORTHRUP  1,794,863
ELECTRIC FURNACE METHOD
Filed Aug. 3, 1928

Inventor
Edwin F. Northrup.
by
Attorney.

Patented Mar. 3, 1931

1,794,863

UNITED STATES PATENT OFFICE

EDWIN FITCH NORTHRUP, OF PRINCETON, NEW JERSEY, ASSIGNOR TO AJAX ELECTROTHERMIC CORPORATION, OF AJAX PARK, NEW JERSEY, A CORPORATION OF NEW JERSEY

ELECTRIC-FURNACE METHOD

Application filed August 3, 1928. Serial No. 297,189.

My invention relates to the application of electric induction to the heating of materials which are not electrically conducting when cold and which may or may not be electrically conducting when heated.

The main purpose of my invention is to distribute energy absorbers within the mass to be heated and to develop the heat required initially and if necessary finally within these energy absorbers.

A further purpose is to introduce within a mass of poor electrical conductivity to be heated within an inductor furnace lumps of electrically conducting material having a higher melting point than the temperature to which the mass is to be raised.

Figure 1:
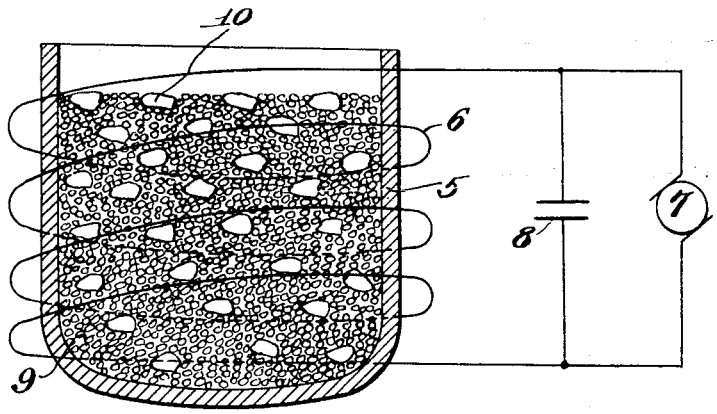
Figure 2:
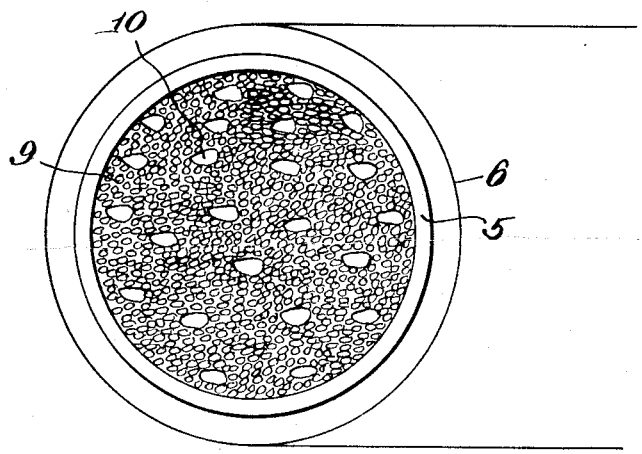

One form of my invention is illustrated in the drawing in which Figures 1 and 2 are a vertical section and a top plan view respectively, illustrating one application.

It is desirable to heat or melt many materials which have not lent themselves to electric induction heating in the past because of their powdered form or because they are non-conductors of electricity initially or at all times.

My invention is capable of application alike to ores which are to be smelted, to materials which are to be melted and to materials which are to be heat treated merely. In all cases they are here viewed as materials to be "heated." Preliminarily, of course, they must be sufficiently broken up or be finely enough divided to make it possible to scatter energy absorbing masses throughout them.

When a coil is thrown about a solid charge to be heated or about a divided charge in a crucible or other charge container and alternating current is passed through the coil, it is well known that alternating currents are induced within the charge if it be electrically conducting and that the heating effect increases as the rate of change of the current so induced increases, i. e., with the frequency of the inducing charge. However, if the charge be electrically non-conducting no current will be induced in it and the inductive method of heating it will not be applicable.

I have discovered that a finely divided charge may be heated effectively by inducing electrical current within electrically conducting masses or nodules scattered through the mass to be heated, so that the charge is heated by thermal conduction and radiation to the desired temperature or to a temperature at which the charge itself becomes electrically conducting and current induced in the charge assists in continued heating of the charge.

A good example of this lies in the melting of iron oxide existing in a powder and having so high a resistance to the passage of electric currents that it is impracticable to induce currents in a charge of cold iron oxide.

On the other hand if a number of lumps of pure iron for example be mixed with the iron oxide and alternating current be passed through a coil surrounding the mass, the lumps or nodules of iron oxide will become heated and will heat and ultimately melt the charge.

Various materials, including certain ores progressively reduce in electrical resistance with increase in temperatures and for such materials though non-conductors when cold, the materials themselves become conductors when heated by the energy absorbing lumps so that the materials themselves absorb energy in progressively increasing quantity as the temperature rises thus assisting in the melting of the charge. This is true of iron oxide.

Because the lumps or nodules used are relatively small even though very much larger than the parts of the charge which they are heating, it is desirable to use a relatively high frequency in order to get the advantage of improved power factor in furnace operation by avoidance of having the induced secondary energy appreciably pass the center of the lumps or nodules.

In the drawing I have shown a conventional Northrup furnace comprising a non-conducting crucible 5 surrounded by an inductor coil 6 supplied by a generator 7 and having power factor correction by condenser 8. The charge is shown in mass 9 and the energy absorbers are seen at 10.

I plan to use for energy absorbers materials which are free from contamination of the charge and which melt at quite an appreciably higher temperature than that to which the charge about them is to be raised. The melting point of pure iron is high enough for pure iron lumps safely to be used in the heating of iron oxide. Gas carbon or other forms of carbon are of course capable of use to attain very much higher temperatures, in those cases where the material to be heated is not reduced by carbon.

The distribution of the energy absorbers with relation to the charge will differ, of course, with the intended purpose. Where the energy absorbers must melt the charge by conduction it may be desirable to concentrate them at the surface, but where the charge becomes conductive when partly heated it is best to scatter the lumps through the charge. The relative size of the lumps and their number and the proportion which their total mass bears to the mass of the charge is readily determined by experiment under the furnace conditions in which the work is to be performed.

By finely divided materials I do not mean to suggest that they must be powdered but merely that they are in small form and will make intimate enough contact with the energy absorbers for reasonable heat transfer from the heating masses to the heated mass. I wish also to point out that the process is beneficial even when the material which is finely divided is a good conductor of electricity but when, by reason of its divided form and at the frequency available it can not be heated to advantage by induction within its own material.

My invention will operate on commercial frequency circuits but is carried out much better with frequencies of the order of 500 or more.

It will be evident that my invention does not depend upon electrical conductivity from lump to lump, but, whether there be contact or not between the lumps it depends primarily upon the independent heating of each lump by currents induced within it.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. The method of melting a charge of finely divided dry material which consists in mingling energy absorbing lumps of electrically conducting material within the charge to be heated, the lumps being large enough to be separately heated by induction in passing an alternating electric current about the charge and lumps to heat the charge by heating the lumps and continuing the heating operation until the finely divided material, is melted.

2. The method of melting a charge of finely divided dry material which consists in mingling with the charge energy absorbing lumps of electrically conducting material free from contaminating influences upon the charge and having a melting point higher than the temperature to which the charge is to be heated, the lumps being large enough to be separately heated by induction and in passing an electric current of high frequency about the charge and lumps to melt the charge by heating the lumps.

3. The method of melting a charge of dry material having a high resistance to flow of electric current through the mass of the charge, which consists in finely dividing the charge, in selecting energy absorbing lumps of electrically conducting material having a higher melting point than the temperature to which the charge is to be heated and free from objectionable combination with the charge, and in mingling these lumps with the charge, the lumps being large enough to be separately heated by induction and passing high frequency electric current about the charge and lumps to induce electric current in the lumps and to heat them, thus melting the charge.

4. The method of mixing finely divided dry material having a high resistance to flow of electric current through the mass at normal temperatures but of better electrical conductivity at higher temperature, which consists in selecting lumps of electrically conducting material having a higher melting point than the temperature to which the charge is to be heated and free from objectionable combination with the charge, the lumps being large enough to be separately heated by induction in mingling these lumps within the finely divided charge, and passing high frequency electric current about the charge and including the lumps to induce electric current in the lumps and heat them, thus heating the charge and in finally melting the charge by combined induction in the lumps and charge.

5. The method of heating finely divided material having a high resistance to flow of electric current through the mass at normal temperatures but of better electrical conductivity at higher temperatures, which consists in selecting lumps of electrically conducting material, in mingling these lumps within the finely divided charge and passing high frequency electric current about the charge and including the lumps to induce electric current in the lumps and heat them, thus heating the charge and in finally heating the charge by combined induction in the lumps and charge.

6. In the art of melting finely divided material having very poor electrical conductivity, walls restricting the finely divided material and within which it is contained, lumps of electrically conducting material large enough to be separately heated by induction, interspersed within the finely divided material, an inductor coil surrounding the material and lumps and a source of alternating current connected with the coil and having a frequency above commercial frequency.

EDWIN FITCH NORTHRUP.